(12) United States Patent
Hokans

(10) Patent No.: US 11,832,770 B2
(45) Date of Patent: Dec. 5, 2023

(54) DISPOSABLE COMMODE RECEPTACLE

(71) Applicant: North Shore Medical, LLC, Knife River, MN (US)

(72) Inventor: Mark Hokans, Knife River, MN (US)

(73) Assignee: North Shore Medical, LLC, Knife River, MN (US)

( * ) Notice: Subject to any disclaimer, the term of this patent is extended or adjusted under 35 U.S.C. 154(b) by 0 days.

(21) Appl. No.: 17/774,931

(22) PCT Filed: Nov. 5, 2020

(86) PCT No.: PCT/US2020/059171
§ 371 (c)(1),
(2) Date: May 6, 2022

(87) PCT Pub. No.: WO2021/092219
PCT Pub. Date: May 14, 2021

(65) Prior Publication Data
US 2022/0386831 A1 Dec. 8, 2022

Related U.S. Application Data

(60) Provisional application No. 62/931,480, filed on Nov. 6, 2019.

(51) Int. Cl.
*A47K 11/04* (2006.01)

(52) U.S. Cl.
CPC .................................. *A47K 11/04* (2013.01)

(58) Field of Classification Search
CPC ....................................................... A47K 11/04
USPC ............................................................ 4/451
See application file for complete search history.

(56) References Cited

U.S. PATENT DOCUMENTS

| | | | |
|---|---|---|---|
| 3,444,563 A * | 5/1969 | Gordon, Jr. | A47K 11/04 4/484 |
| 3,772,712 A | 11/1973 | Renn et al. | |
| 3,920,179 A * | 11/1975 | Hall | A61J 19/00 4/144.2 |
| 4,610,039 A | 9/1986 | Stern | |
| 5,095,556 A * | 3/1992 | Franey | A47K 17/026 4/483 |
| 5,377,861 A | 1/1995 | Landis | |
| 5,535,913 A | 7/1996 | Asbach et al. | |
| 5,636,871 A * | 6/1997 | Field | B65D 33/00 114/361 |
| 5,707,173 A | 1/1998 | Cottone et al. | |
| 5,961,167 A | 10/1999 | Gilley | |
| D485,404 S * | 1/2004 | Del Prato | D34/6 |
| 7,080,418 B2 | 7/2006 | Henegar | |
| D631,948 S | 2/2011 | Yoshida et al. | |
| D638,522 S | 5/2011 | Yoshida et al. | |
| D706,908 S | 6/2014 | Knapp | |

(Continued)

*Primary Examiner* — Huyen D Le
(74) *Attorney, Agent, or Firm* — CAMPBELL IP LAW LLC (57) ABSTRACT

A disposable commode receptacle comprises an annular body comprising a top opening with a first diameter and a bottom opening with a second diameter smaller than the first diameter, and a wall extending between the top opening and bottom opening and having an inside surface and an outside surface, the outside surface comprising ribs. The disposable commode receptacle may also include an inside-out bag which is friction fit to the annular body.

15 Claims, 6 Drawing Sheets

(56) References Cited

U.S. PATENT DOCUMENTS

| | | |
|---|---|---|
| D837,950 S | 1/2019 | Santos |
| D846,095 S | 4/2019 | Copeland et al. |
| D846,096 S | 4/2019 | Copeland |
| D852,336 S | 6/2019 | Copeland |
| D852,935 S | 7/2019 | Copeland |
| D888,903 S | 6/2020 | Gunther et al. |
| D896,369 S | 9/2020 | Chase et al. |
| D917,026 S | 4/2021 | Pacheco et al. |
| 2008/0092284 A1 | 4/2008 | Cyr |
| 2016/0025326 A1* | 1/2016 | Gonchar ................ A47K 11/04 362/127 |

* cited by examiner

DISPOSABLE COMMODE RECEPTACLE

PRIORITY CLAIMS

This application claims the benefit of International Application No. PCT/US2020/059171 filed Nov. 5, 2020, which claims the benefit of U.S. Provisional Application No. 62/931,480 filed Nov. 6, 2019, the entireties of which are hereby incorporated by reference into this application.

BACKGROUND

The present disclosure relates in general to toilet and commode sanitation products, and more particularly, to a disposable commode receptacle suitable for various medical care environments including hospitals, nursing homes and hospice facilities, for example.

Commode chairs are commonly used in health and nursing care environments including in intensive care, emergency departments, post operation/recovery, gastroenterology, hospice, home health care, geriatric and other locations. Reusable buckets are designed to slide underneath the seat in an armature style commode system and must be emptied of their contents and sterilized by care staff. This includes the arduous and risky task of separating the contents, so that wipes are disposed of separately before emptying and flushing excrement down a toilet. The buckets are then commonly taken to a "hopper" room where they are supposed to receive a 5-minute bleach scrub or other sterilization procedure.

However, reusable bucket systems give rise to numerous problems. Most importantly, improperly sterilized buckets are a large cause for the spread of health care-associated infections (HAIs), including *Clostridioides difficile* (*C. diff*) and methicillin-resistant *Staphylococcus aureus* (MRSA) infections. *C. diff* is a bacterium that causes diarrhea and colitis, and even after a 5-minute bleach scrub over 50% of the bacteria may still survive. *C. diff* alone is estimated to cause almost half a million illnesses in the United States each year, and within a month of diagnosis, 1 in 11 people over the age 65 will die of a healthcare-associated *C. diff* infection. In the US, the consequences of managing *C. diff* exceed $3.2 billion annually.

Further, with commodes utilizing the reusable buckets, injuries and disease transmission often occur when a patient's excrement splashes back upon their skin or rectal area from an improperly sterilized bucket, or when a care worker is unwittingly exposed during cleaning of the bucket and then transmits the disease to themselves or to their patients. Even the most diligent care worker may be exposed to disease or contaminated during the sterilization procedures, where droplets can aerosolize during cleaning or splash back onto a worker.

Beyond just the health risks, the discomfort and burden of cleaning the buckets is cited as a major reason for staff turnover at many hospice and other care institutions. The risk of contamination is further compounded when such care staff are overworked and cut corners when cleaning the buckets, or in some cases temporarily store them in a closet or other risky location until they can make time for the sterilization procedure. This also leads some care staff to skip the step of separating and throwing away solid wipes from the excrement, and instead flush it all down the toilet leading to clogged pipes and plumbing expenses. In many hospitals, these plumbing issues are a major resource burden for their maintenance staff and budget.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure relates to a disposable commode receptacle.

In one aspect, a disposable commode receptacle comprises an annular body comprising a top opening with a first diameter and a bottom opening with a second diameter smaller than the first diameter; a wall extending between the top opening and bottom opening and having an inside surface and an outside surface, the outside surface comprising ribs.

In another aspect, a disposable commode receptacle further comprises an inside-out bag friction fit to the annular body.

DETAILED DESCRIPTION

Disclosed herein is a disposable commode receptacle product optimized for use in facilities that utilize portable or bedside commodes, including but not limited to hospitals, nursing homes and hospice care facilities, as well as methods regarding the same. Through use of the disposable commode receptacle described herein, HAIs including *C. diff* infection rates may be significantly reduced while improving care staff job satisfaction. Further, implementation and product costs may easily be justified through labor savings, reduced plumbing maintenance, and overall reduced incidence of HAIs.

Figure 1:
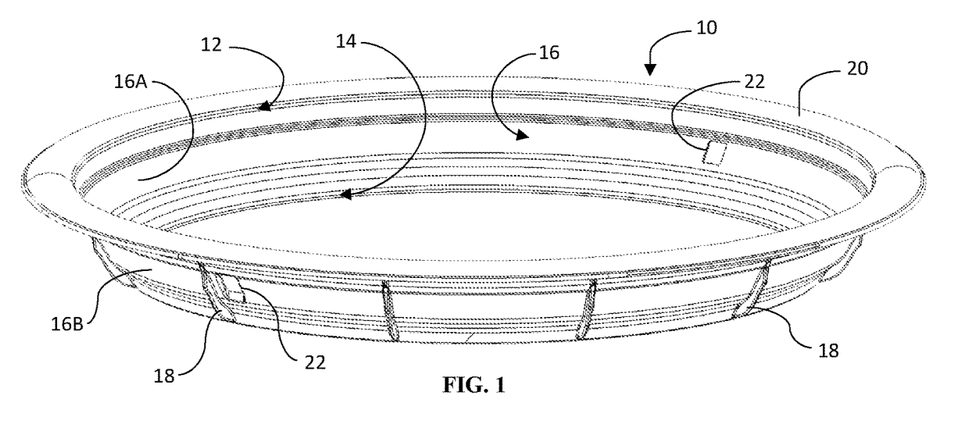
FIG. 1 is a perspective view of a disposable commode receptacle annular body.

FIG. 1 is a perspective view showing the annular body 10 of a disposable commode receptacle 100, which is configured to be stackable as described with reference to FIGS. 7 and 8, as well as to be joined with a bag via friction fit as described with reference to FIG. 9 to form the fully functional disposable commode receptacle 100. Annular body 10 has a top opening 12 and a bottom opening 14, and a wall 16 extending between top opening 12 and bottom opening 14. Wall 16 has an inside surface 16A and an outside surface 16B, and a plurality of ribs 18 projecting laterally from outside surface 16B to form narrow fin-shaped structures. As shown in FIG. 1, ribs 18 also project axially between top opening 12 and bottom opening 14 and are equidistantly spaced around outside surface 16B of wall 16, though other configurations and modifications may be appreciated while preserving the function of the disposable commode receptacle 100. For example, although 12 of the ribs 18 are shown, about 6 ribs to about 18 ribs may also be suitable, and their spacing may not be equidistant though such configuration is preferable.

Further shown is rim 20 extending outwardly or laterally from top opening 12. Rim 20 may comprise a convex shape as shown in the Figures in order to provide a comfortable seating surface as well as provide improved structural strength for maintaining overall shape of the annular body 10 under stress or use conditions.

Annular body 10 may also include holes 22 for receiving a removably zip tie, for example, such that a user may remove the zip tie from either of holes 22 and use it to securely close off the contents of the bag of the receptacle 100 after use.

Figure 2:
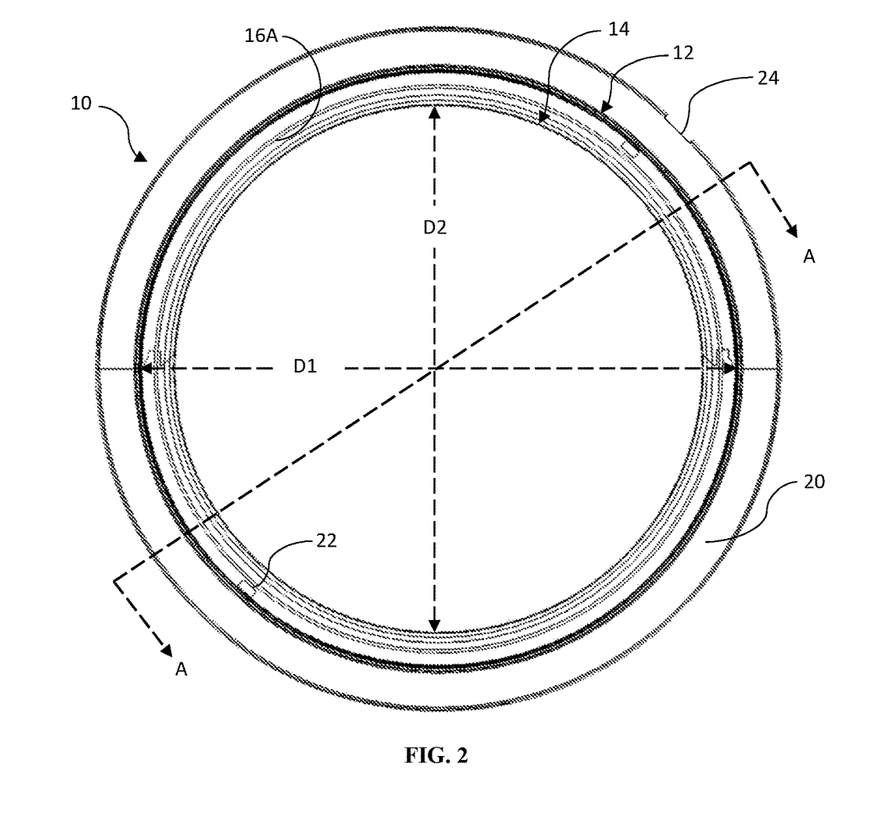
FIG. 2 is a top perspective view of a disposable commode receptacle annular body.

FIG. 2 is a top perspective view of annular body 10, further showing diameter D1 of top opening 12 and diameter D2 of bottom opening 14, and a tooling notch 24 resulting from an injection molding process. The annular body 10 of the disposable commode receptacle 100 may comprise plastic, for example. Suitable plastics include but are not limited to polypropylene. Annular body 10 is optimized to only have one tooling notch to prevent snagging and tearing of a bag when interference fit with annular body 10, as described in more detail with reference to FIG. 9.

Figure 3:
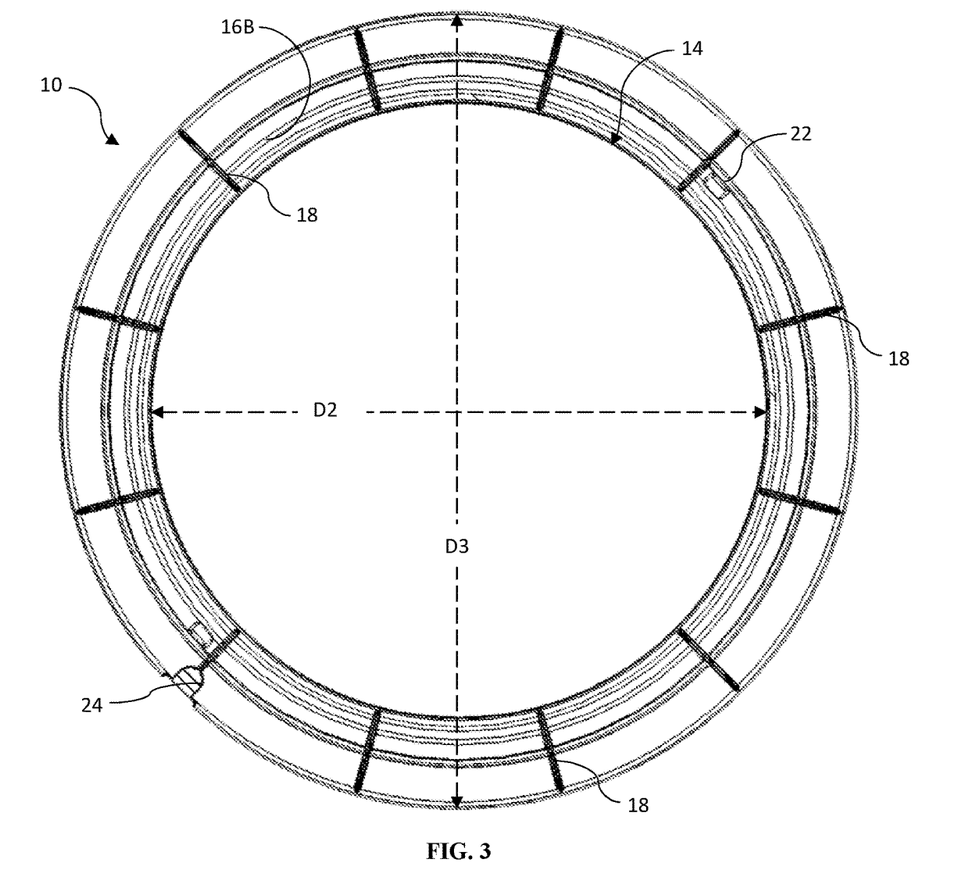
FIG. 3 is a bottom perspective view of a disposable commode receptacle annular body.

FIG. 3 is a bottom perspective view of annular body 10, more clearly showing the underside features including ribs 18 equidistantly spaced around the circumference of the body, and diameter D2 of bottom opening 14, as well as diameter D3 for the maximum outer extent of annular body 10. Diameter D1 of top opening 12 is larger than diameter D2 of bottom opening 14, thereby forming a sloped wall 16 extending therebetween. Diameter D1 may be from about 10.5 to about 11.5 inches, more preferably about 10.7 inches, while diameter D2 may be from about 9.0 inches to about 10.0 inches, more preferably about 9.4 inches. Diameter D3 may be from about 12 inches to about 14 inches, more preferably about 12.1 inches.

Figure 4:
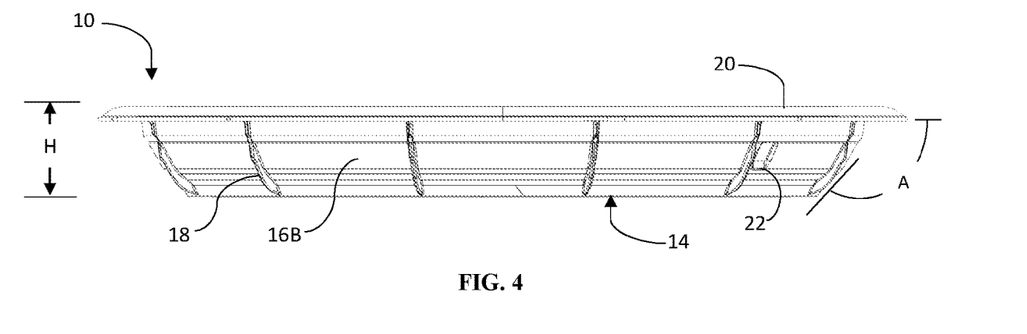
FIG. 4 is a side perspective view of a disposable commode receptacle annular body.

FIG. 4 is a side perspective view of annular body 10, showing height H and angle A. The height of annular body 10 may be from about 0.5 inches to about 2 inches, more preferably about 1.4 inches. An angle A of wall 16 extending between horizontal parallel planes defined by top opening 12 and bottom opening 14 may be between about 110° and about 130°, more preferably about 120°. In the case of a contoured wall 16, angle A may be taken as an average across the contour of the wall.

Figure 5:
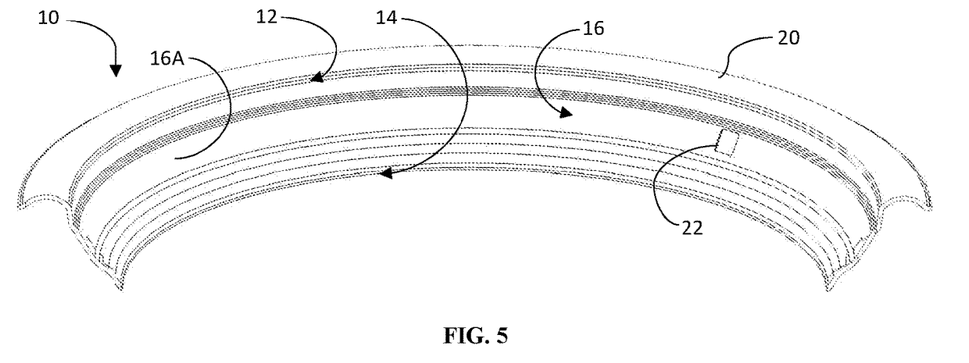
FIG. 5 is a perspective view of a disposable commode receptacle annular body taken along cross-section A-A of FIG. 2.

FIG. 5 is a cross sectional view A-A of FIG. 2, showing a cross section of annular body 10. As can be seen, wall 16 including its inside surface 16A has a first contoured shape with a smooth profile along the surface, which is configured to be compatible with a second contoured shape of ribs 18 as described in more detail with reference to FIGS. 7 and 8 below.

Figure 6:
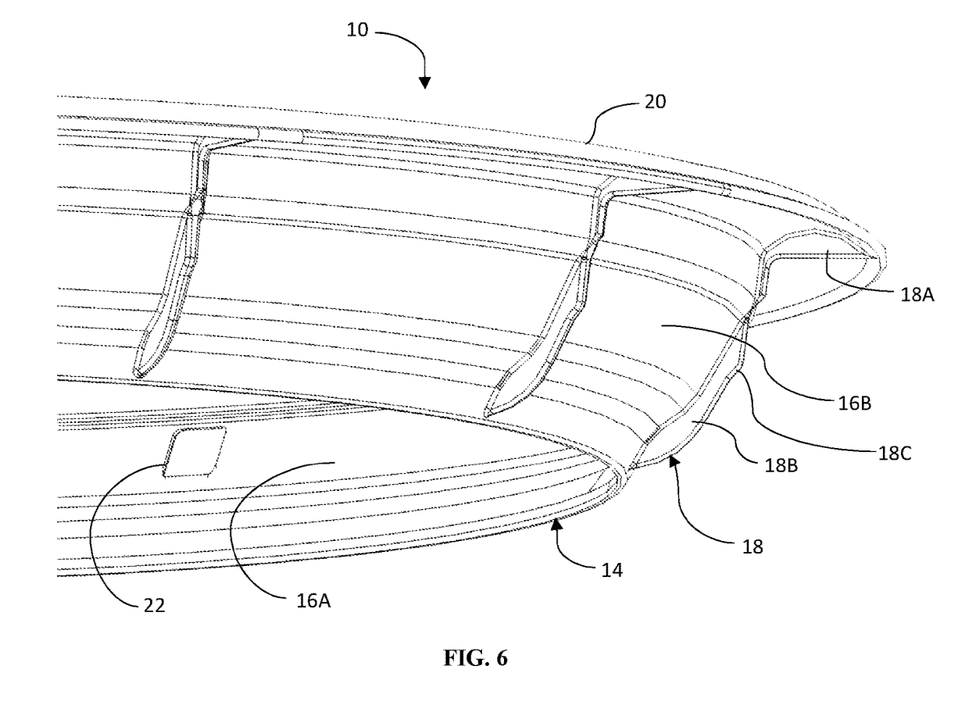
FIG. 6 is an enlarged perspective view of a side outside portion of a disposable commode receptacle annular body.

FIG. 6 is an exploded perspective view of annular body 10, further showing portions of rib 18 as a first portion 18A and second portion 18B, wherein the first portion 18A projects underneath or on an underside of the convexly shaped rim 20, and the second portion 18B projects laterally from outside surface 16B as described in previous examples. First portion 18A of ribs 18 functions to provide improved structural resiliency to rim 20 to prevent warping or distortion of annular body 10 under use or long-term storage conditions. For example, rib portion 18A may prevent the convex shape of rim 20 from caving in or distorting.

The particular design and circumferentially equidistant placement of ribs 18 with their first portion 18A and second portion 18B also function to provide overall structural rigidity to annular body 10 in a manner which reduces the overall amount of material needed to construct the body 10. In other words, if ribs 18 were not present, annular body 10 would require a thicker material including thicker walls 16 and thicker rim 20 to withstand distortion, and the additional volume and weight of this material needed would be in excess of the volume and weight of material required for creating the ribs 18. Therefore, the optimized design of annular body 10 functions to provide the minimum amount of material, such as plastic, to be utilized while still meeting or exceeding specifications for end-use in commode systems. Consequently, annular body 10 can be manufactured at lower cost, less shipping weight, and with lower waste for the environment, which are valuable features considering its one-time disposable use.

Further shown in FIG. 6 is an additional rib feature 18C, which provides an angular portion configured for improving a friction fit with a bag as described with reference to FIG. 9. Angular portion functions to bite into and assist in grabbing the plastic material of a bag without tearing it and comprises a sharp-angled bevel but without a sharp surface that would tear a bag material. A maximum lateral projection or "height" of rib portion 18B from outside surface 16B may be between about 0.10 inches to about 0.15 inches, more preferably about 0.13 inches, which also supports the function of ribs 18 to push into a plastic bag material for additional securement of a friction fit thereto.

Figure 7:
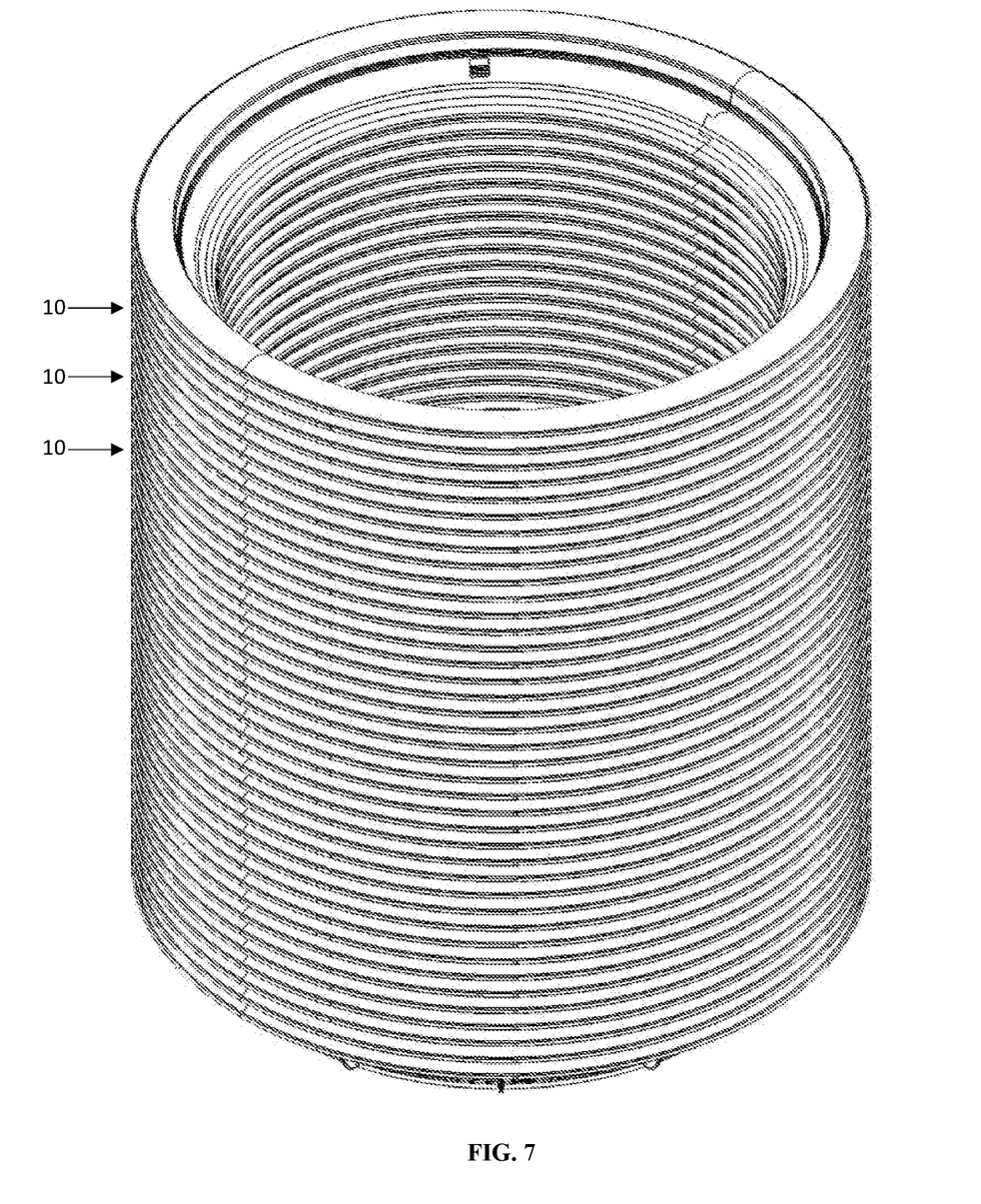
FIG. 7 is a perspective view of multiple disposable commode receptacle annular bodies in a nested stacked configuration.

FIG. 7 is a perspective view of multiple annular bodies 10 in a nested stacked configuration. As can be seen in FIG. 6, ribs 18 comprise a second contoured shape as part of rib portion 18B which is configured to fit inside of the first contoured shape of wall 16 inside surface 16A (as described with reference to FIG. 5). This may be further appreciated with reference to FIG. 8, which is an enlarged cross-sectional view of a portion of FIG. 7 to show the inner features of the nested stacked fit between annular bodies, including the interface of ribs 18 and wall 16 inside surface 16A.

Figure 8:
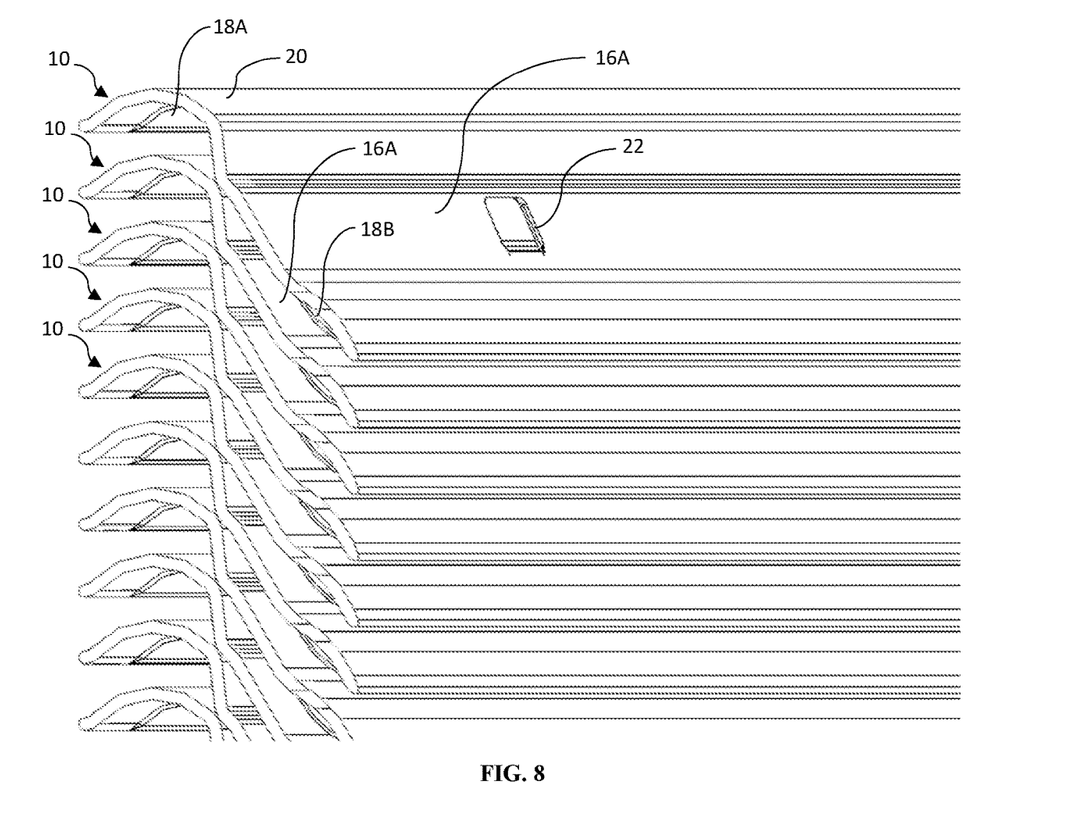
FIG. 8 is an enlarged cross-sectional view of a portion of FIG. 7.

As may be appreciated from FIGS. 7 and 8, numerous annular bodies 10 may be stacked in a tight, nested configuration due to the optimized design of the annular body's features, including the angle A of wall 16, contoured shapes of ribs 18 and inside surface 16A, and dimensions including diameters D1 and D2, height H, and maximum lateral projection of ribs 18, as non-limiting examples. Due to these optimizations working synergistically, a nested stacking height of about 14 inches may comprise at least 40 annular bodies 10, or a nested stacking height of about 17 inches may comprise at least 50 annular bodies 10. These stacking heights are ideal for minimizing packaging materials and shipping cost, as well as storage space in end-use facilities such as hospitals. Further, as described previously, due to the optimized design utilizing ribs 18 as structural reinforcing members including portions 18A and 18B, as well as convex rim 20, the plastic used to create the annular bodies 10 is reduced as well as the weight. For example, according to the presently disclosed design, the weight of the annular body 10 may be from about 2 to about 3 ounces, more preferably about 2.3 ounces.

Figure 9:
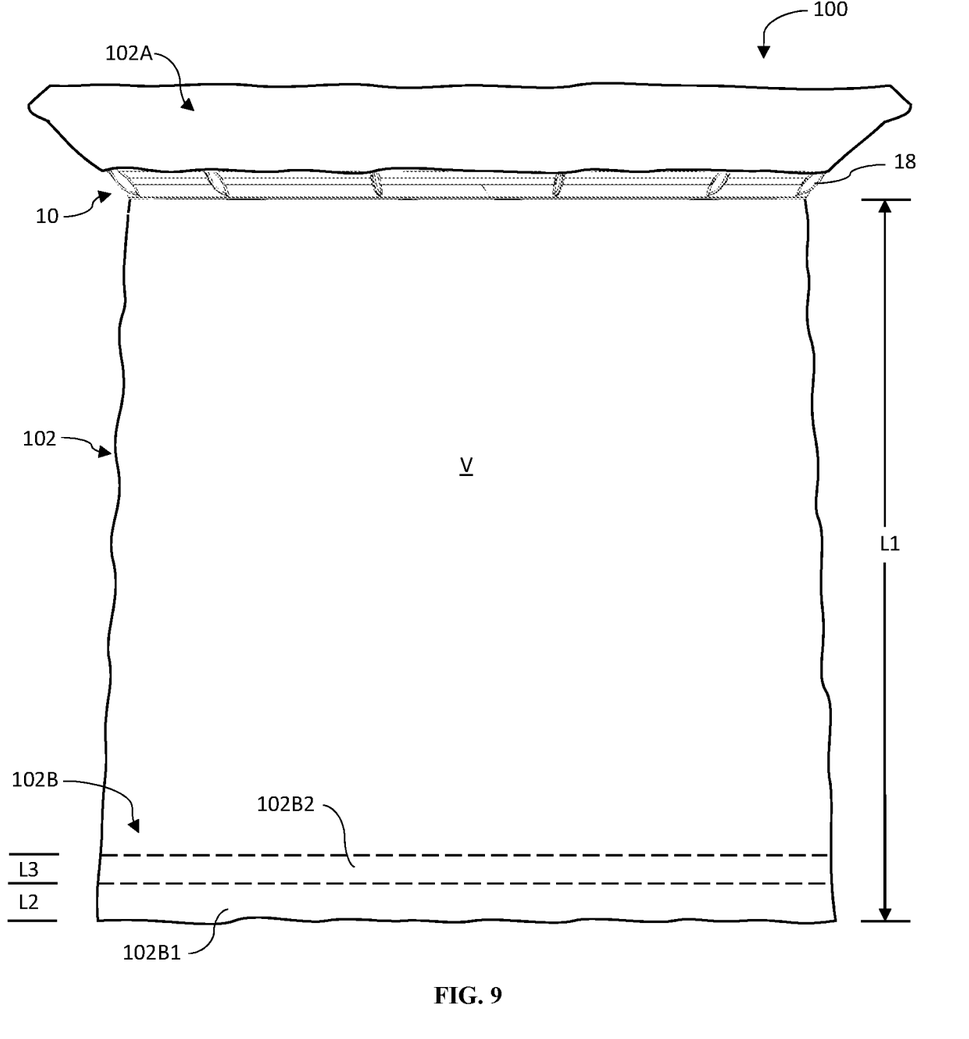
FIG. 9 is a side perspective view of a disposable commode receptacle including the annular body and a bag friction fit to the annular body.

FIG. 9 is a side perspective view of a disposable commode receptacle 100 including annular body 10 and a bag 102 friction fit to the annular body. Bag 102 includes a top portion 102A and a bottom portion 102B. Top portion 102A is an open portion of bag 102, and bottom portion 102B is a closed portion of bag 102. In order to friction fit bag 102 to annular body 10, bag 102 is first turned inside-out, and then the top portion 102A is stretched out over top opening 12 and rim 20 as well as ribs 18. As described previously, the design of ribs 18 including their dimensions as well as their contour, including rib feature 18C, enable an optimal and very secure friction fit with bag 102. The bottom portion 102B of bag 102 is then passed through bottom opening 14 of annular body 10 to hang underneath the annular body 10, thereby defining an inner volume V of bag 102 into which waste, such as human excrement, can be received.

Bottom portion 102B of bag 102 further comprises a seal 102B1, such as a heat seal for example, and an overhang 102B2. As shown in FIG. 9, because bag 102 is turned inside-out, seal 102B1 ends up at the bottom of bag 102, while overhang 102B2 ends up inside of inner volume V. In this way, both the seal 102B1 and overhang 102B2 are presented inside the inner volume V of bag 102. This inside-out configuration is optimal because it causes the material at bottom portion 102B to balloon out around seal 102B1 rather than form an apex at seal 102B1, thereby distributing load, such as human excrement, more evenly around the bottom of bag 102 and improving its weight bearing capability to minimize bag failure at seal 102B1.

The portion of bag 102 hanging beyond bottom opening 14 of annular body 10, shown as L1 in FIG. 9, should have a length of at least about 12 inches, preferably about 12 to about 20 inches, more preferably about 18 inches. Bag 102 prior to friction fit with annular body 10 may comprise an overall length of about 18 to about 30 inches, preferably about 22 to about 26 inches, most preferably about 24 inches. Seal 102B1 may have a length L2 (or width) of about 0.4 inches, more preferably about ⅜ inches. Overhang 102B2 may have a length L3 (or width) of about 0.6 inches, more preferably about ⅝ inches. Bag 102 when laid flat may have an overall width of about 12 to about 20 inches, more preferably about 16 inches. Bag 102 may comprise a thickness of between about 1 to about 3 mil, more preferably 2 mil.

Bag 102 may comprise plastic, for example, or more preferably, about 30% metallocene and about 70% linear low-density polyethylene (LLDPE). Further agents may be added to the formulation of bag 102 to make it biodegradable, for example. Bag 102 may further comprise a dye to render it opaque, or of an opaque color sufficient to obscure the contents of inner volume V of the bag when in use. As an example, the opaque color may comprise blue.

Further, an absorbent material, such as an absorbent pad, may be placed inside of inner volume V of bag 102 to enhance the performance of the disposable commode receptacle 100. Preferably, absorbent material is capable of absorbing between 400 mL to about 1000 mL, more preferably about 600 mL.

When constructed according to the present disclosure, the annular body 10 and disposable commode receptacle system 100 are configured for suitable use in almost all industry-standard commode chairs, for example, about 90% to about 95% of commode chairs. For example, in armature commode chairs the disposable commode receptacle 100 can slide in under the seat portion, while in "hourglass" design commode chairs the receptacle 100 can hang from the wire structure under the seat. It may be appreciated that minor modification to the design and dimensions may be made to accommodate the design variations and specifications of other commode chairs while maintaining the optimized functionality of the disposable commode receptacle 100.

Experimental Method

The following experiments were performed utilizing the annular body 10 and disposable commode receptacle 100, including bag design, as described with reference to the Figures, utilizing the most preferred specifications provided in the description for each dimension and other relevant features unless noted otherwise below. Further details of each experiment are provided with reference to the following Examples.

Example 1-24 Hour Weight Bearing Test for Friction Fit

Actual-use scenarios were estimated based on the average urine and fecal output of a 192 lb person. For urine, the average output is 800 to 2000 mL per day, while the average person will defecate anywhere from 3 times a day to 3 times a week, and about 1 oz for every 12 lbs they weigh (about 1 lb for a 192 lb person).

A disposable commode receptacle 100 having an 18 inch portion of bag 102 hanging beyond bottom opening 14 of annular body 10 (shown as L1 in FIG. 9) was constructed for the testing. Combinations of fluid volume (to simulate urine) and solid weight (to simulate feces) and weight alone were added to the internal volume V of bag 102. For solid weight, standardized objects like lacrosse balls (5.5 oz), dumbbells (5 lbs) and kettlebells (10 lbs) were utilized. After 24 hours the disposable commode receptacles were tested, and were given a "pass" when no anomalies such as bag tearing, leakage, or failure of the friction fit were observed.

Example A was set up as a normal "single use" scenario for an average person, whereas Example B was set up as an abnormal "extended use" scenario where a single commode receptacle would be used for an entire 24 hour period for a patient rather than being properly disposed of after each use (i.e. a worst case or negligence scenario for a medical care situation). These Examples included a commercially available 600 mL absorbent pad inserted into the inner volume V of bag 102. To further test the limits of the friction fit between bag 102 and annular body 10, Example C utilizing a solid weight of 5 lbs, Example D utilizing a solid weight of 10 lbs, and Example E using a solid weight of 15 lbs were also tested. The results of these tests are presented in TABLE 1 below.

TABLE 1

| Example | Fluid Volume | Solid Weight | Total Weight | Test Result after 24 hours |
|---|---|---|---|---|
| A | 600 mL | 5.5 oz | 1.58 lbs | Passed |
| B | 1800 mL | 16.5 oz | 4.8 lbs | Passed |
| C | X | 5 lbs | 5 lbs | Passed |
| D | X | 10 lbs | 10 lbs | Passed |
| E | X | 15 lbs | 15 lbs | Passed |

As shown by the results of TABLE 1, all of the Examples A-D passed with no anomalies, leakage or failures of the friction fit. Surprisingly, the friction fit was so effective utilizing the design of the annular body and bag combination, that even a 15 lb weight did not result in failure, which is way beyond any foreseeable actual use scenario. In fact, after three weeks, the bag in Example E was still holding to the annular body and no failures were observed. Further, it was clear that the inside-out bag 102 method with the inverted seal 102B1 was more than sufficiently strong to withstand both actual and exaggerated use scenarios.

Example 2— Splashback Test Method

The disposable commode receptacle 100 of the present disclosure was tested against industry-standard off-the-shelf commode buckets having the typical depths of 6 inches and 8 inches to determine whether the disposable commode receptacle 100 would result in less splashback injuries, as well as to find an optimal length and configuration for the disposable commode receptacle bag 102.

To simulate an actual single-use scenario, it was estimated that an average person will urinate about 400 mL (or about 2 cups), while an average 192 lb person will defecate about 1 lb in a day, potentially spread out over three bowel movements in separate or single sessions. Accordingly, a 5.5 oz rubber lacrosse ball was used to simulate a single bowel movement or defecation dropped into 2 cups of fluid.

A 3'×3'×11" sawhorse style holder was built to simulate a commode frame structure for holding the buckets and disposable commode receptacles tested. Water used for the testing was colored with food coloring until extremely dark/highly visible, and 2 cups of the colored water was placed into each tested bucket or disposable commode receptacle. Disposable commode receptacles were constructed having bag 102 lengths L1 hanging beyond bottom opening 14 of annular body 10 of varying depths as provided in TABLE 2 below, including to match the depth of the industry standard re-usable commode buckets, and included the 600 mL absorbent pad in the bottom of each. The re-usable buckets were not provided with an absorbent pad because in actual practice, absorbent pads are not utilized because they pose clogging issues for plumbing and cannot be easily separated from the excrement and thrown away.

A frame was constructed having 4 mil thick clear plastic wrap stretched across the frame, with a hole the size of a lacrosse ball cut into the center of the plastic wrap. To perform the testing, the frames were placed across the top of each bucket or disposable commode receptacle top opening 12 and the lacrosse ball was dropped from the level of the plastic through the hole in a consistent and reproducible manner such that the ball fell into each bucket and each inner volume of the bags. After dropping the ball, a photo was taken of the plastic wrap and the number of colored droplets was counted to quantify potential splashback injuries from the buckets versus the receptacles of the present disclosure. Each configuration was tested three times and the results in TABLE 2 below are presented as the average of those tests.

TABLE 2

| Receptacle Type | Length (inches) | Average Number of Splashback Droplets |
| --- | --- | --- |
| Re-usable Bucket | 6 | 47.3 |
| Re-usable Bucket | 8 | 21.0 |
| Receptacle | 6 | 0.7 |
| Receptacle | 8 | 1.0 |
| Receptacle | 12 | 0 |
| Receptacle | 15 | 0 |
| Receptacle | 19 | 0 |

As can be appreciated from the results of TABLE 2, the disposable commode receptacle of the present disclosure, when using L1 lengths of 12 inches or more, resulted in zero splashback droplets. Further, even at lengths of 6 and 8 inches to match the industry standard re-usable buckets, splashback injuries were reduced by at least 20-fold, from 21 droplets to just 1 droplet for the 8 inches bucket comparison, for example. Accordingly, use of the disposable commode receptacle of the present disclosure is envisioned to dramatically reduce the risk of contamination and contagion of diseases passed through human excrement in a health care setting based not only on the receptacle's disposable nature, but also through its optimized design which greatly minimizes or eliminates splash-back contamination.

While the invention has been described with reference to exemplary aspects, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular aspects(s) disclosed, but that the invention will include all embodiments and aspects falling within the scope of the appended claims.

The invention claimed is:

1. A disposable commode receptacle comprising:
an annular body comprising a top opening with a first innermost diameter and a bottom opening with a second innermost diameter smaller than the first innermost diameter; a wall extending between the top opening and bottom opening and having an inside surface and an outside surface, the outside surface comprising ribs;
a rim extending outwardly from the top opening, wherein the rim comprises a convex shape, and wherein the ribs comprise a first portion projecting completely underneath the convex shape of the rim and a second portion projecting laterally from the outside surface of the wall; and
an inside-out bag friction fit to the annular body, wherein an open end of the bag is stretched over the top opening and the ribs, and a closed end of the bag is presented through the bottom opening of the annular body to hang underneath the annular body when in use such that the former outside surface of the bag defines an inner volume into which waste can be received.

2. The disposable commode receptacle of claim 1, further comprising wherein the ribs project laterally from the outside surface of the wall.

3. The disposable commode receptacle of claim 2, further comprising wherein the inside surface of the wall comprises a first contoured shape having a smooth profile.

4. The disposable commode receptacle of claim 3, further comprising wherein the ribs comprise a second contoured shape configured to fit inside of the first contoured shape to enable nested stacking of multiple disposable commode receptacles.

5. The disposable commode receptacle of claim 4, further comprising wherein a nested stacking height of about 14 inches contains at least 40 disposable commode receptacles.

6. The disposable commode receptacle of claim 5, further comprising wherein the first diameter is about 10.5 inches to about 11.5 inches, and the second diameter is about 9.0 inches to about 10.0 inches.

7. The disposable commode receptacle of claim 5, further comprising wherein a maximum lateral projection of the ribs is between about 0.10 inches to about 0.15 inches from the outside surface of the wall.

8. The disposable commode receptacle of claim 1, further comprising wherein the ribs extend axially between the top opening and the bottom opening.

9. The disposable commode receptacle of claim 1, further comprising wherein the ribs are equidistantly spaced around the outside surface of the wall.

10. The disposable commode receptacle of claim 1, further comprising wherein the bag maintains the friction fit with the annular body for more than 24 hours when holding at least 15 lbs of weight.

11. The disposable commode receptacle of claim 1, further comprising a seal and an overhang at the closed end of the bag, wherein the seal and the overhang are presented inside the inner volume of the bag.

12. The disposable commode receptacle of claim 1, further comprising wherein the bag further comprises an opaque color sufficient to obscure the contents of the inner volume of the bag.

13. The disposable commode receptacle of claim 1, further comprising an absorbent material in the inner volume of the bag.

14. The disposable commode receptable of claim 13, further comprising wherein a portion of the bag hanging beyond the bottom opening of the annular body has a length of at least about 12 inches.

15. The disposable commode receptacle of claim 14, further comprising wherein a splashback result is zero droplets according to the splashback test method.

\* \* \* \* \*